(12) United States Patent
Sharma et al.

(10) Patent No.: US 9,990,439 B2
(45) Date of Patent: Jun. 5, 2018

(54) FLEXIBLE METHOD AND SYSTEM FOR PROVIDING DIGITAL CONTENT

(75) Inventors: Kshitij Sharma, Glen Oaks, NY (US); Pranav Kamkhalia, Flushing, NY (US)

(73) Assignee: NBCUniversal Media, LLC, Wilmington, DE (US)

( * ) Notice: Subject to any disclaimer, the term of this patent is extended or adjusted under 35 U.S.C. 154(b) by 981 days.

(21) Appl. No.: 11/893,167

(22) Filed: Aug. 14, 2007

(65) Prior Publication Data

US 2009/0049052 A1 Feb. 19, 2009

(51) Int. Cl.
*G06F 17/30* (2006.01)
*H04L 29/08* (2006.01)

(52) U.S. Cl.
CPC .......... *G06F 17/3089* (2013.01); *H04L 67/02* (2013.01)

(58) Field of Classification Search
None
See application file for complete search history.

(56) References Cited

U.S. PATENT DOCUMENTS

| | | | |
|---|---|---|---|
| 6,452,609 B1* | 9/2002 | Katinsky et al. | 715/716 |
| 6,801,576 B1* | 10/2004 | Haldeman et al. | 375/240.29 |
| 7,162,697 B2* | 1/2007 | Markel | H04N 7/088 348/E5.006 |
| 7,165,178 B2* | 1/2007 | Gien | G06F 21/645 705/67 |
| 7,240,126 B1* | 7/2007 | Cleasby et al. | 709/246 |
| 2004/0199605 A1* | 10/2004 | LaCroix et al. | 709/218 |
| 2005/0076214 A1* | 4/2005 | Thomas et al. | 713/170 |
| 2005/0166257 A1* | 7/2005 | Feinleib | H04N 7/163 725/136 |
| 2007/0136443 A1* | 6/2007 | Sah | G06F 17/30867 709/219 |
| 2008/0154951 A1* | 6/2008 | Martinez et al. | 707/103 |
| 2008/0281898 A1* | 11/2008 | Pesce | G06F 17/30873 709/201 |

FOREIGN PATENT DOCUMENTS

EP 1128286 A2 8/2001

OTHER PUBLICATIONS

PCT International Search Report and Written Opinion for PCT/US2008/067468, International Filing date Jun. 19, 2008.
Weaver, Alfred C., et al., Multicast Distribution and Control for Streaming Multimedia, 2001, pp. 1806-1809, IECON'01: The 27th Annual Conference of the IEEE Industrial Electronics Scoiety, 0-7803-7108-9/01.

* cited by examiner

*Primary Examiner* — Thomas Dailey

(57) ABSTRACT

A system and method for disseminating digital content, including receiving at a server a request from a user computer for a browser displayable interface definition, and sending from the server to the user computer the interface definition including resource tags, the resource tags being interpretable for linking to sources of the digital content.

23 Claims, 4 Drawing Sheets

FLEXIBLE METHOD AND SYSTEM FOR PROVIDING DIGITAL CONTENT

BACKGROUND

The present invention relates generally to the field of providing digital content, and more particularly to a digital content distribution technique that allows for customized distribution and playing of digital content via management or control by an external entity.

Many systems have been developed and are currently in use for providing digital content, such as movies, music, videos, text, and so forth. Such digital content may be supplied by a holder (a supplier) of the content to a distributor, for example. The distributor may then provide the digital content to the consumer via a distributor's web site, for example. There is an on-going need in the industry to more efficiently provide and distribute such content. Moreover, suppliers and distributors generally desire to attract consumers to the distributor's web site to increase the amount and quality of traffic (of consumers) to their web sites. Advantageously, increased traffic may increase exposure to various products being sold or distributed via the supplier or distributor web site, allow for increased advertising rates on the given web site, and so on.

BRIEF DESCRIPTION

The present technique provides a media content distribution method and system designed to respond to such needs. In accordance with one aspect of the invention, a method is provided for disseminating digital content, including receiving at a server a request from a user computer for a browser displayable interface definition, and sending from the server to the user computer the interface definition including resource tags, the resource tags being interpretable for linking to sources of the digital content.

In accordance with another aspect of the invention, a method is provided for disseminating digital content, including: receiving a request from a user computer for a browser displayable player definition; sending to the user computer the player definition including resource tags, the resource tags being interpretable for linking to sources of the digital content; and sending the digital content to the user computer based upon the resource tags. The digital content may be sent from a plurality of different universal resource locator addresses.

In accordance with yet another aspect of the invention, a method is provided for disseminating digital content, including: receiving a request from a user computer for a browser displayable player definition; sending to the user computer the player definition including resource tags, the resource tags being interpretable for linking to sources of the digital content, the player definition being sent to the user computer from server most geographically local to a user computer from among the plurality of geographically dispersed servers; and sending the digital content to the user computer based upon the resource tags. In certain embodiments, the digital content is sent to the user computer from the same server that sent the player definition.

In accordance with an aspect of the invention, a system is provided for disseminating digital content, including: a server configured to stores a plurality of displayable player definitions for a plurality of content distributors, to receive a request from a user computer for a browser displayable player definition, and to send the interface definition to a content distributor; wherein the interface defintion includes resource tags, the resource tags being interpretable for linking to sources of the digital content; wherein the interface comprises a player for playing digital content; and wherein the server is configured to select a player from the plurality of players for sending to the user computer based upon the request received from the user computer.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
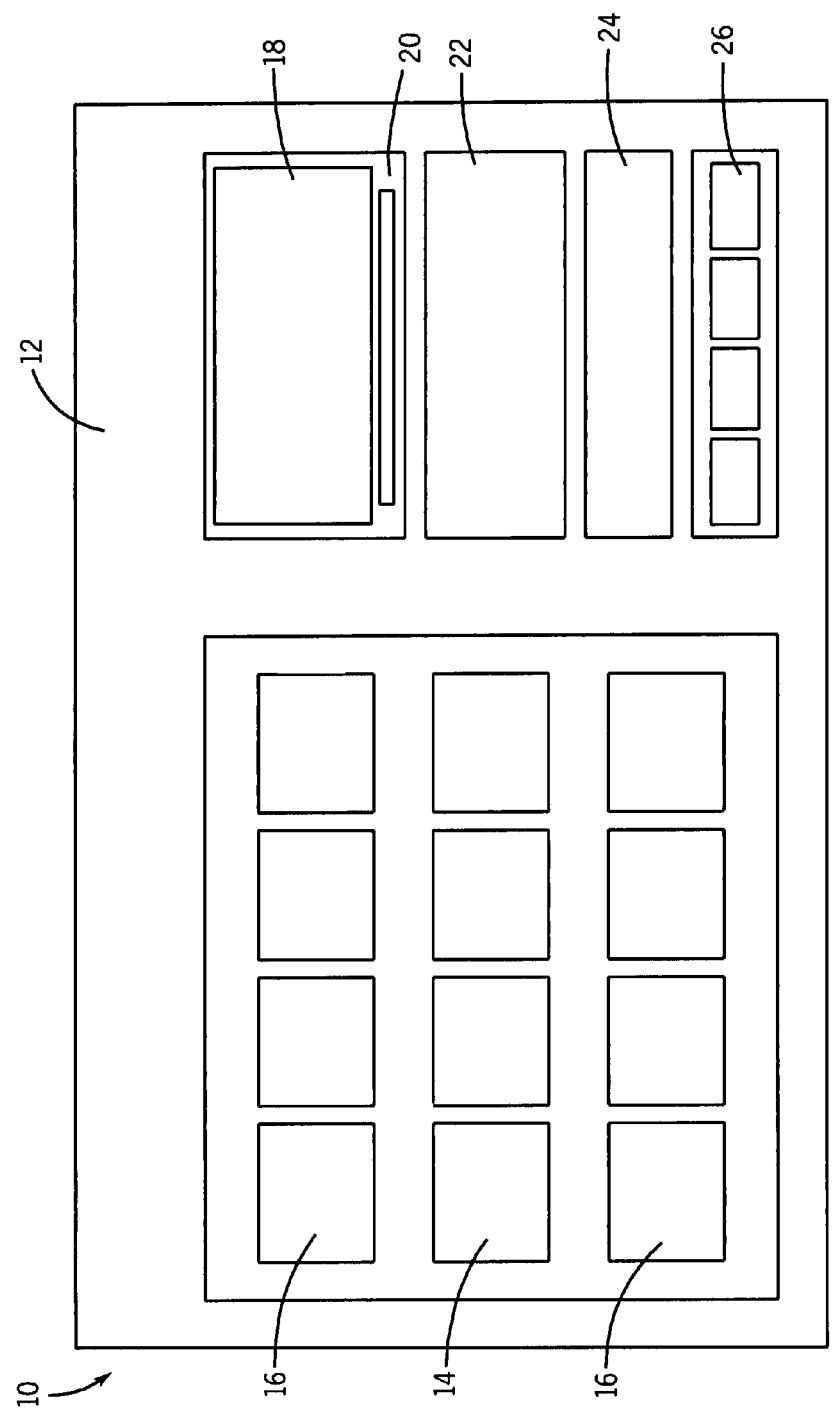
FIG. 1 is a diagrammatical representation of a user-computer browser or display in accordance with aspects of the present invention.

In general, the present techniques accommodate a supplier to offer digital content to a distributor (customer) and ultimately to the consumer, so that the distributor, for example, may experience greater traffic on its Web sites due to the availability of digital content. While in certain examples, the distributor may be thought of as the customer of the supplier of the digital content, the consumer may be the ultimate viewer of the digital content. The interface may be a player for playing the digital content. The server may store a plurality of players for a plurality of content distributors, and a player from the plurality of players may selected for sending to the user computer based upon the request received from the user computer.

The interface (e.g., media player) of the distributor's site which may display the digital content may be customized for the specific distributor, yet managed by the supplier. Further, the distributor may embed tags or empty container in their Web page for receiving the digital content. Thus, the digital content may reach the consumer by a supplier injecting content onto the distributor's Web site. The surface material on the distributor's Web site may incorporate injected objects at run time.

Again, the present technique is generally directed to disseminating and receiving digital content, such as audio, text, video, or audio-visual content, and so on, such content which may be streaming and/or progressive download, for example. In certain embodiments, a request is received at a server from a user computer for a browser-displayable interface definition, the interface including a player for playing digital content. In response, an interface or player definition including resource tags are sent from the server to the user computer. It should be noted that the server may store a plurality of players for a plurality of content distributors. A player from the plurality of players may be selected for sending to the user computer based upon the request received from the user computer. In addition, the server may be one of a plurality of geographically dispersed servers capable of providing the server definition and the content. In one example, the server utilized is most geographically local to the user computer on which the code is executed from among the plurality of geographically dispersed servers. Lastly, digital content may be sent (from the same server or different server) to the user computer based upon the resource tags, which are interpretable for linking to sources of the digital content. The digital content may be sent from a plurality of different universal resource locator addresses.

In sum, the present technique facilitates the efficient and readily-available display of quality media content to the consumer. Thus, again, suppliers and distributors may benefit from increased traffic (by consumers) to their web sites. Indeed, the availability of such media or digital content may lure consumers to the given web site. As discussed, increased traffic may increase exposure to products being sold by the distributor, allow for increased advertising rates, and so on. Further, in certain embodiments, such benefits may be realized without significant customization by the distributor.

Throughout the present discussion, reference will be made to various entities, such as suppliers, distributors, users, consumers, and so on, and sites associated with digital content sources and destinations. As those skilled in the art will recognize, in the entertainment industry, certain entities will generally generate, create, or receive content, while these or other entities will distribute, sell, or otherwise provide the content to users. However, in the present context, any or even all of these should be understood as included under the umbrella terms supplier, distributor, end-user, consumer, and the like. That is, they may be any person or entity that transmits or receives digital content. It is not necessary for a content source to have generated such content, nor that the content source owns the intellectual property rights relating to such content.

Turning to the figures, FIG. 1 is a representation of a user-computer 10 having a display 12. On the illustrated display 12, a thumbnail section 14 having thumbnails 16 is depicted. The display 12 may be in a browser which pages constructed in various mark-up languages, such as Hypertext Markup Language (HTML). Further, an exemplary player 18 (an interface for playing digital content) having controls 20 is available to the user on the display 12. Related thumbnails section 22, metadata components section 24, and ad banner 26, all of which are discussed in more detail below, are depicted on the display 12.

In operation, a consumer or user may click on a thumbnail 16 (e.g., with a mouse pointer) to display or play the associated video, audio, or text of the thumbnail 16 in the interface or player 18. In this example, when a thumbnail 16 is selected or clicked, the player 16 (i.e., player component) receives a request to play the selected video clip via a script function (e.g., a JavaScript function) via a parameter (e.g., ClipID) passed to the player 18. The player 16 may pass the ClipID to the related video section 22, where related video thumbnails or links may be displayed.

The player 18 requests media (e.g., video clip) metadata from the server platform for the selected media file (e.g., video clip). The player 18 or player 18 component then passes the media (clip) metadata to the metadata section 24, which may provide a link to a web site of supplying server, and/or to any desired web site associated with the media file or supplier of the media file. Lastly, if a player 18 receives an advertisement with the selected video clip, the advertisement video (and/or audio and/or text) is displayed. The player 18 then sends the advertisement details to the advertisement banner 26 component. In this example, the player 18 component broadcasts script (JavaScript) notices when advertisement play has begun and when advertisement play is complete. Such an approach may facilitate Document Object Model (DOM) objects to recognize and change state during ad plays, for example.

It should be noted that DOM is a programming interface specification which facilities a programmer to create and modify HTML pages and XML documents as full-fledged program objects. The Document Object Model offers two levels of interface implementation: DOM Core, which supports XML and is the base for the next level, and DOM HTML, which extends the model to HTML document. Moreover, the DOM specification may provide for for how objects in a Web page (text, images, headers, links, etc.) are represented. The DOM may define what attributes are associated with each object, and how the objects and attributes can be manipulated. Dynamic HTML (DHTML) relies on the DOM to dynamically change the appearance of Web pages after they have been downloaded to a user's browser.

Figure 2:
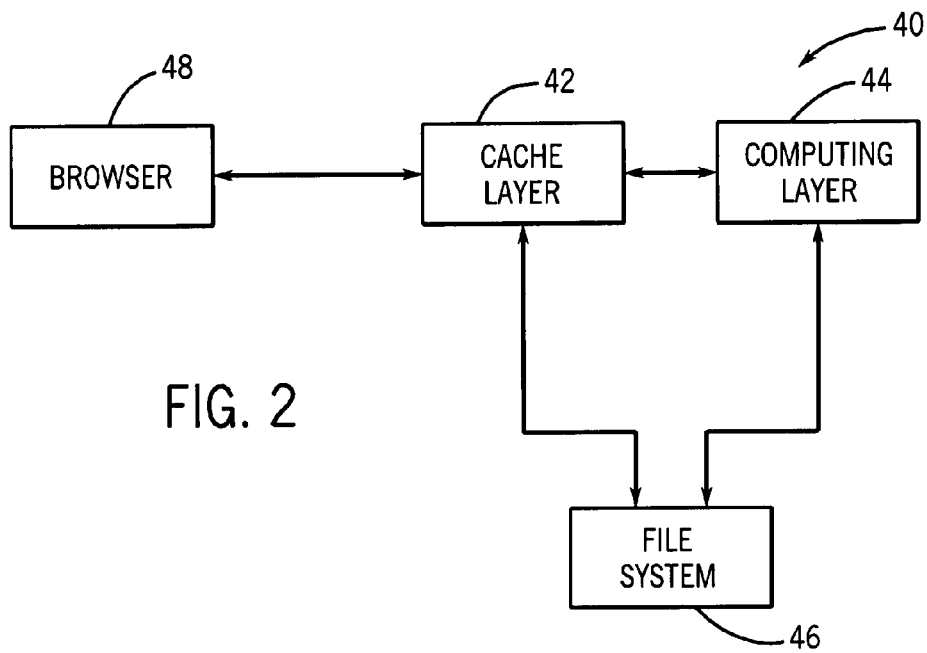
FIG. 2 is a diagrammatical representation of a digital content delivery system in accordance with aspects of the present invention.

FIG. 2 depicts components of a content delivery system 40, including a cache layer 42, a computing layer 44, and a file system 46. In the illustrated embodiment, the cache layer 42 serves a computer browser 48, such as a user or client browser. The file system 46 may store digital content, and provide digital content to the browser 48 via the computing layer and cache layer 42. The browser 48 may be efficiently served digital content form the cache layer 42. The cache layer 42 may be updated via the computing layer for changes in the digital content or in the user-request for digital content. Moreover, the depicted content delivery system 40 may be accommodated by a variety of configurations. For example, the computing layer 44 and file system 46 may be disposed on a personal computer or laptop computer. In this case, the cache layer 42 may be software cache disposed on the personal computer or laptop.

In another example, the cache layer 42 may be a server 42 (e.g., edge server), the computer layer 44 may be a farm of computing servers 44 (e.g., edge computing servers), and the file system 46 may be a content delivery network 46. In such a scenario, a server 42 may be labeled an edge server because it interfaces with the client browser 48, and/or it is a server located most near (geographically) to the distributor, end-user, or client browser 48, and the like. However, it should be emphasized that employment of an edge server is only exemplary and not meant to limit the present technique.

Further, an application for the content delivery system 40 associated with the server 42 may be disposed on the computing servers 44. Thus, the servers 44 may provide for computing power and also contain the application associated with server 42. A content delivery network 46 may provide advantages of greater predictability and scalability relative to a general or local file system 46, for example. Lastly, it should also be emphasized that there are a variety of configurations that may accommodate the general layout depicted in FIG. 2.

In certain embodiments, the computing layer (e.g., computing servers 44) may intercede user requests, interpret distributor or customer name variables, and select the appropriate player or player definition from an XML file, for example. As appreciated by the skilled artisan, XML (Extensible Markup Language) allows information and services to be encoded with structure and semantics. The XML may be beneficial for information exchange, and extended to include user-specific and industry-specific tags, for example.

In an embodiment where the file system 46 is a content delivery network 46, the network 46 may represent a custom entity or system having various servers, which may be centralized and/or dispersed. The network 46 may contain digital content for delivery to a distributor and ultimately to the end-user or consumer. The network 46 may cache content once accessed so that it can be served quickly and/or locally, intercept requests from the user and serve content available in local cache, and contain custom XML files for each customer distributor player. The network 46 may also provide SWF (flash object) components which can interpret, contribute, and play protocols and the associated audio or video. In some embodiments, the SWF object is not embedded, but instead is pulled at run time (i.e., upon the selection of thumbnail or link by the user at the browser 48) from the network 46 via the server 42 to request the provided content.

The actual components and systems used in the present technique for delivery digital content may be disposed in central and distributed locations. That is, the supplier will typically use a number of storage devices, servers, communications devices, and so forth, which will be connected by a network on the content provider side. The network may include any range of network media and protocols, including conventional telephony connections, Internet connections, cabled and wireless connections, satellite connections, and so forth. Moreover, the content and data for provision of the content and regulation of its use may be communicated in accordance with any suitable protocol, such as the conventional TCP/IP protocol used for Internet communications.

Figure 3:
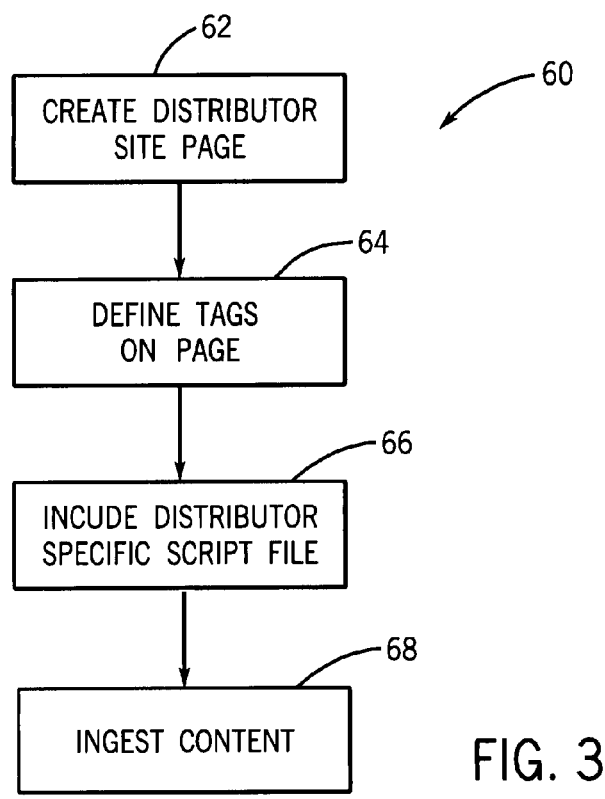
FIG. 3 is a block diagram of an exemplary server-side method for delivering digital content in accordance with aspects of the present invention.

FIG. 3 depicts an exemplary method 60 for providing digital content. Initially, a distributor site page is created, as indicated by reference numeral 62. The distributor site page may be accessible, for example, by a user or consumer via a web browser (e.g., a user browser 48) over the Internet. Next, tags (e.g., HTML <div> tags) may be defined on the distributor site page, and may act as containers for various components (e.g., thumbnails, links, player, ad banners, etc.) to be displayed via the distributor site page at the user-computer browser 48 (block 64). A <div> tag may be defined for each of the components discussed in FIG. 1, for example. In general, the <div> tag defines logical divisions within the content of a page, providing for divisions/sections in a document. Again, these tags may be HTML <div> tags, which may act as reservoirs or containers for the receipt and holding of digital content, and may be embedded in various Web pages by the distributor or customer. It should be noted, that component display sizes may be returned in an <embed> tag, for example.

Exemplary <div> tags (defined within an HTML page) for exemplary components are listed and tabulated below. It should be emphasized that the following tags, code, and sizes only given as examples and are not meant to limit the present technique.
<div id="videoPlayerComponent"></div>
<div id="related VideoComponent"></div>
<div id="advertisementComponent"></div>
<div id="linkComponent"></div>
<div id="logoComponent"></div>
<div id="metadataComponent"></div>

TABLE 1

Exemplary HTML <div> Tags

| Div ID | <Div> Description |
| --- | --- |
| videoPlayerComponent | This contains the Video Screen component that players video stream. |
| relatedVideoComponent | This contains the Related Videos component that displays content associated with the content currently being played. |
| advertisementComponent | This contains the Advertising component that would show banner AD (expandable and rolled-in). |
| linkComponent | This contains the link component that links back to NewSite. |
| logoComponent | This contains the logo component that displays NewSite logo. |
| MetadataComponent | This contains metadata component that shows title, desc, length etc for the clip that is being played. |

TABLE 2

Exemplary Returned Component Sizes (in <Embed> Tag)

| Components | Height | Width |
| --- | --- | --- |
| videoPlayerComponent | 348 | 405 |
| relatedVideoComponent | 120 | 400 |
| AdvertisementComponent | 250 | 300 |
| linkComponent | 50 | 300 |
| logoComponent | 50 | 300 |
| metadataComponent | 70 | 400 |

Further, a distributor-specific script file (e.g., JavaScript file) may be installed on the distributor site page (block 66). For example, a JavaScript file may be disposed at the bottom of the HTML page before the close of the <body tag>, or immediately after all of the <div> tags. The size defined in the <div> tags can be equal or greater than the sizes of the actual <div> tags in certain embodiments. A tag may be used to assign a script object to a variable. As known to those skilled in the art, JavaScript is a scripting language that can use the native functionality of a Web browser. JavaScript statements can appear throughout an HTML document as blocks of code or single statements attached to individual tags. The <script> tag generally provides functionality (i.e., defines an executable script) and attributes.

Again, in operation, a user may click on thumbnails or links, for example, on the distributor site page to view the associated distributed content. In certain embodiments, the content may be ingested from the supplier Content Management System (CMS) via feeds into the distributor's CMS, for example, surfacing as thumbnails and metadata on the distributor site page (block 68). The various content may have a reference link to invoke a script (JavaScript) function, for example, thereby passing the clip identification (ClipID) as a parameter. This parameter may send a message to the video component and play the corresponding video stream, for example.

As known to the skilled artisan, a Content Management System (CMS) is generally a software system used for management of content including computer files, image media, audio files, electronic documents, web content, and so on. A CMS may faciliate the importation and and creation of documents and multimedia material , as well as provide for archival functions. In the present technique, supplier content may be generally be ingested in the distributor partner's custom CMS via feeds, for example. To provide for integration with the distributor's consumption framework existing feeds, the supply service may write connectors that generate feeds in specific formats of the distributor's system. With custom connector architecture, the distributor partner may have access to the supplier service content with substantially no customization by the distributor. It should be noted, however, as a default implementation, standard media FSS feeds (MFSS) may be also available.

It should be noted that the employment of markup and scripting languages, or the particular types of such languages, is not meant to limit implementation of the present technique. Moreover, the exemplary hardware configurations discussed herein are not meant to limit the technique. Indeed, the skilled artisan will recognize that a variety of hardware and software configurations may accommodate the content delivery systems of the present technique.

Figure 4:
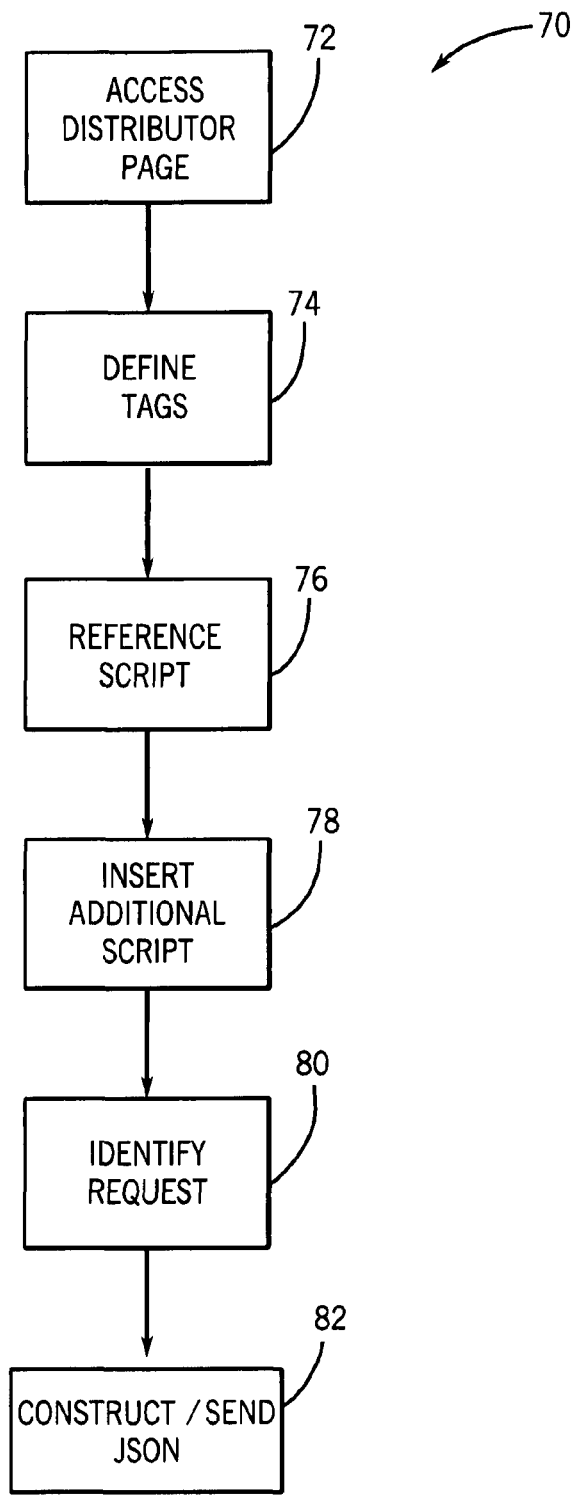
FIG. 4 is a block diagram of an exemplary server-side method for delivering digital content in accordance with aspects of the present invention.

FIG. 4 depicts an exemplary method 70 (a more detailed presentation of method 60) for providing digital content. Initially, a distributor page is accessed, as indicated by reference numeral 72. As indicated, in this embodiment, the <div> tags are defined in the HTML code of the distributor page for the components to be disposed on the distributor page. Again, the <div> tags may designate the location on the page of the components (e.g., thumbnails 16, player 18, etc.) with height and width constraints, for example (block 74). As discussed, a distributor-specific script file (e.g., JavaScript file) for players (for playing digital content) is referenced in the client or distributor HTML page (via a script tag) which may be fetched from the supplier computer, supplier server, or edge server, etc., as referenced by block 76. The script file, which includes coordinates, pulls content from the computer or server (e.g., laptop computer, server, edge server, or cache layer, etc.) to populate the <div> tags. The distribution-specific script file that is returned may contain a global object. This object inserts another script tag (e.g., JavaScript file) in the body of the distributor page that may send a request to the server with a global unique identifier (GUID) parameter (block 78).

In block 80, the server identifies the GUID parameter as an application request and forwards it to the computing layer (e.g., computing layer or computing servers 44). Lastly, as indicated by reference numeral 82, an application (e.g., an edge application) may pull the distributor-player specific GUID from the request. The application may then locate the corresponding GUID XML, which may be stored along with the JavaScript file on the supplier computer or server (e.g., cache layer or edge server 42, computing layer 44, file system 46). The server may then parse the XML and retrieve the location of the associated component XMLs (i.e., the components to be displayed on the distributor page). Then, the server (e.g., edge server, etc.) locates and parses the associate component XMLs to retrieve the corresponding SWF URLs. In this example, the server (e.g., edge server 42) may then construct a JavaScript Object Notation (JSON) object and populate the SWF URLs of each component with other required parameters appended to the Universal Resource Locator (URL). The JSON object, for example, may provide height and width sizes of the various components. Lastly, the server sends back the JSON object as a response back to the browser (e.g., browser 48) of the distributor page.

Figure 5:
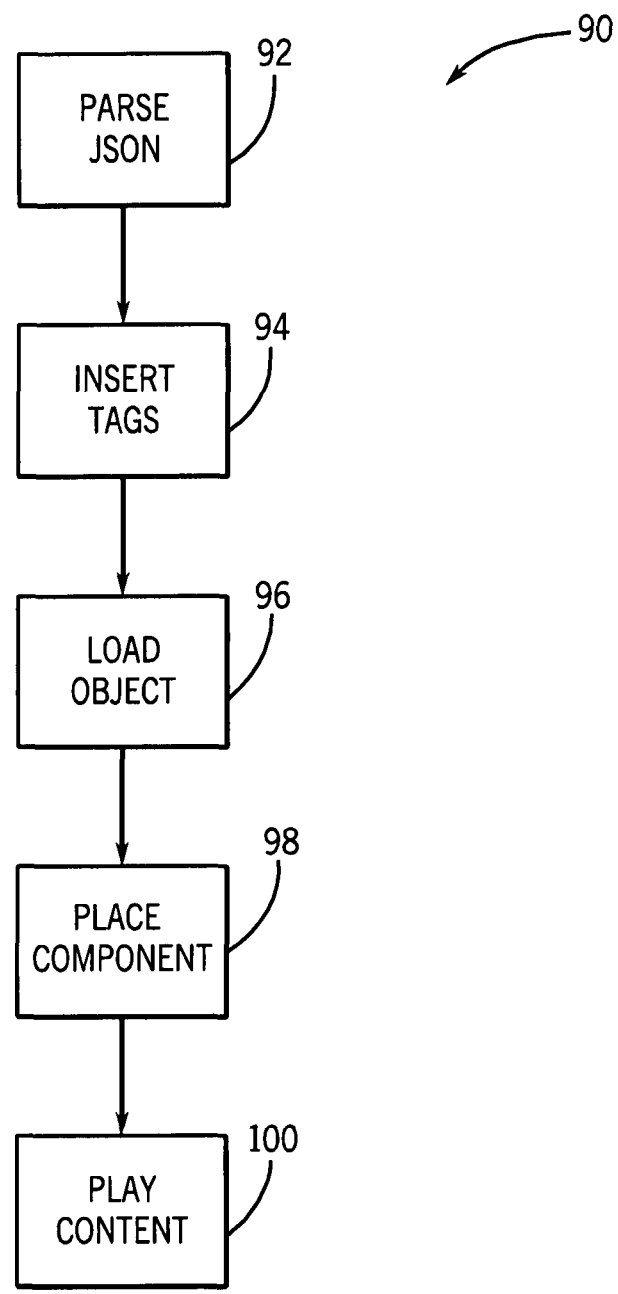
FIG. 5 is a block diagram of an exemplary user-side technique for receiving digital content in accordance with aspects of the present invention.

FIG. 5 depicts a technique 90 for distributing and receiving digital content. Initially, at the user-computer having a browser with the distributor site page displayed, the JSON object returned (as discussed with regard FIG. 4) is parsed (block 92) to extract all the components/objects URLs. In other words, at the user browser, the JSON parsing logic may be imbedded in the distributor-specific JavaScript file. The JavaScript file may then modify the HTML DOM tree, for example, at run time to adapt dynamically to insert <embed> tags within the <div> tags defined by the distributor, as indicated by reference numeral 94.

In block 96 of the illustrated embodiment, the client browser may then interpret the <embed> tags as resource request and send a request to the URL (extracted from the JSON object discussed above in block 92) to load the SWF object (flash object which defines contents for components) from the server cache, as indicated by reference numeral 96. Subsequently, the client HTML may be rendered with all the various components placed at the desired locations, and with the preferred height and width for each component, as indicated by reference numeral 98. The user may play (block 100) the content by clicking on a thumbnail, for example. The video component starts to play the video stream, and if there is an advertisement pre-roll, for example, a companion banner may be displayer in the advertisement banner or component. Further, related videos associated with the video being displayer in the player) may be shown in the related video section.

Lastly, an exemplary deployment location matrix is tabulated below.

TABLE 3

Exemplary Deployment Location Matrix

| SOFTWARE | DEPLOYMENT LOCATION |
| --- | --- |
| HTML Pages | Distribution Partner Hosting Servers |
| DHTML | Edge Server (CDN File System) |
| JavaScript | Edge Server (CDN File System) |
| Component SWF Files | Edge Server (CDN File System) |
| XML files | Edge Server (CDN File System) |
| Edge Application | Edge Computing Servers |

To summarize, the present technique may disseminate digital content by receiving at a server a request from a user computer for a browser displayable interface definition, and sending from the server to the user computer the interface definition including resource tags, the resource tags being interpretable for linking to sources of the digital content. As discussed, digital content may then be sent to the user computer based upon the resource tags. An object defining universal resource locators for sites at which the digital content can be found may also be sent to the user computer. Parsing logic code for parsing the digital content may be sent to the user computer (i.e., from the server). In certain embodiments, the server may be one of a plurality of geographically dispersed servers. Indeed, the server may be one of a plurality of geographically dispersed servers capable of providing the server definition and the content. Again, in one example, the server is the server most geographically local to a user computer on which the code is executed from among the plurality of geographically dispersed servers.

The digital content may include any object supported by a mark-up language (hypertext mark-up language or HTML), and may be sent from a plurality of different universal resource locator addresses. The digital content may include text, audio, video, or audio-visual content, or any combination thereof, and may be streaming or progressive download, or both. The digital content may be sent to the user computer from the same server (or a different server) that sent the player definition.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for disseminating digital content comprising:
receiving at a server a request from a user computer for a browser displayable interface definition; and
sending from the server, to a browser of the user computer, the browser displayable interface definition comprising:
a user viewable page configured and supplied by a distributor that is an external entity of a supplier that supplies the digital content, the user viewable page comprising:
division tags that define a placement, sizing, or placement and sizing of two or more components that display two or more portions of the digital content supplied by the supplier on the user viewable page, wherein the division tags are dynamically modifiable with embed tags; and
at least one script file, comprising browser-interpretable instructions that cause the browser to:
receive, from the supplier, an object that specifies a set of two or more uniform resource locators (URLs) that provide a location to the digital content corresponding to the two or more components;
embed a set of resource requests in the division tags corresponding to the set of two or more URLs via the embed tags; and
based upon the set of resource requests, send a request to the set of two or more URLs to obtain the digital content;
wherein the browser executes the browser-interpretable instructions, such that the two or more components render the two or more portions of the digital content in the browser at the placement, sizing, or placement and sizing defined by the division tags, using the obtained digital content resulting from the embedded set of resource requests;
wherein the distributor defines the placement, sizing, or placement and sizing of the two or more components that display the two or more portions of the digital content by embedding the division tags in the user viewable page, independent from the supplier; and
wherein the digital content is supplied from the supplier to the distributor via a feed, using a supplier-provided connector that generates the feed in a specific format of the distributor's system without feed customization by the distributor.

2. The method of claim 1, wherein the set of two or more URLs comprise URLs for at least two of: a video player component configured to play a video stream of the digital content, a related video component configured to display content associated with the video stream, an advertisement component configured to show an advertisement, a link component configured to provide a website link, a logo component configured to display a logo, and a metadata component configured to display metadata of the video stream.

3. The method of claim 1, wherein the two or more components comprise at least two of: a video player component configured to play a video stream of the digital content, a related video component configured to display content associated with the video stream, an advertisement component configured to show an advertisement, a link component configured to provide a website link, a logo component configured to display a logo, and a metadata component configured to display metatdata of the video stream.

4. The method of claim 1, comprising sending to the user computer the object defining the URLs where the digital content can be found.

5. The method of claim 1, wherein the at least one script file comprises a distributor-specific script file that indicates which play of a plurality of players, stored by the supplier, should be returned to the user computer.

6. The method of claim 1, comprising sending to the user computer parsing logic code for parsing the digital content.

7. The method of claim 1, wherein the digital content includes any object that a mark-up language supports.

8. The method of claim 7, wherein the mark-up language comprises hypertext markup language.

9. The method of claim 1, wherein the digital content includes audio, video, or audio-visual content.

10. The method of claim 1, wherein the digital content comprises streaming content.

11. The method of claim 1, wherein the digital content comprises progressive-download content.

12. The method of claim 1, wherein the server is one of a plurality of geographically dispersed servers.

13. The method of claim 1, wherein the server is one of a plurality of geographically dispersed servers capable of providing the interface definition and the content.

14. The method of claim 13, wherein the server is the server most geographically local to the user computer on which the code is executed from among the plurality of geographically dispersed servers.

15. An electronic device for disseminating digital content comprising:
a processor configured to:
receive, via the processor, a request from a user computer for a browser displayable player definition;
send, via the processor, to a browser of the user computer the browser displayable player definition, comprising:
a user viewable page configured and supplied by a distributor that is an external entity of a supplier that supplies the digital content, the user viewable page comprising:
division tags that define a placement, sizing, or placement and sizing of two or more components that display digital content supplied by the supplier on the user viewable page; and
at least one script file, comprising browser-interpretable instructions that cause the browser to:
receive, from the supplier, an object that specifies a set of two or more uniform resource locators (URLs) that provide a location to the digital content corresponding to the two or more components;
embed a set of resource requests in the division tags corresponding to the set of two or more URLs; and
send a request to the set of two or more URLs to obtain the digital content;
wherein the browser executes the browser-interpretable instructions, such that the two or more components render the digital content in the browser at the placement, sizing, or placement and sizing defined by the division tags, using the obtained digital content resulting from the embedded set of resource requests;
wherein the distributor defines the placement, sizing, or placement and sizing of the two or more components that display the digital content by embedding the division tags in the user viewable page, independent from the supplier; and wherein the digital content is supplied from the supplier to the distributor via a feed, using a supplier-provided connector that generates the feed in a specific format of the distributor's system without feed customization by the distributor.

16. The electronic device of claim 15, wherein the electronic device stores a plurality of script files for a plurality of content distributors, and wherein a particular script file from the plurality of script files is selected for sending to the user computer based upon an identity of the distributor provided in the request received from the user computer.

17. The electronic device of claim 15, wherein the processor is configured to send, to the user computer, parsing logic code for parsing the digital content from an object containing references to a plurality of pieces of the digital content.

18. A method for disseminating digital content, comprising:

receiving, at a supplier server of a supplier providing the digital content, a request triggered from a script of a user viewable page presented at a browser of a user computer for a browser-interpretable object that specifies a set of two or more uniform resource locators (URLs) that provide a location to the digital content for two or more components to be presented on the user viewable page;

wherein a placement, sizing, or placement and sizing of the two or more components are defined by the user viewable page, using division tags as containers for the digital content received at the user viewable page, wherein the division tags are embedded in the user viewable page by a distributor that is an external entity of the supplier;

sending to the browser of the user computer, based upon an identity of the distributor, the object including the set of two or more uniform resource locators for the digital content corresponding to the two or more components, such that the browser may parse the object, obtain the digital content from the set of two or more URLs, and populate the containers with respective portions the digital content corresponding to each of the two or more components, such that the two or more components render the digital content in the browser at the containers, wherein the respective portions of the digital content are supplied from the supplier to the distributor via a feed, using a supplier-provided connector that generates the feed in a specific format of the distributor's system without feed customization by the distributor.

19. The method of claim 18, wherein the digital content is sent to the user computer from the same server that sent the object.

20. The method of claim 18, wherein the supplier server stores a plurality of players for a plurality of content distributors, and wherein a player from the plurality of players is selected for sending to the user computer based upon the request received from the user computer.

21. The method of claim 18, comprising sending, to the browser of the user computer, parsing logic code for parsing the digital content.

22. A system for disseminating digital content, comprising:

a server comprising a processor and tangible, non-transitory storage, the server configured to:

store in the non-transitory storage a plurality of browser displayable player definitions each of the plurality of browser displayable play definitions corresponding to a particular content distributor of a plurality of distributors that are external entities of a supplier that supplies the digital content to the plurality of distributors;

receive, via the processor, a request from a browser of a user computer for a browser displayable player definition specific to a user viewable page configured and supplied by the particular content distributor, wherein the user viewable page comprises division tags that identify containers for two or more supplier-provided components to be displayed in the user viewable page, the division tags embedded on the user viewable page by the particular content distributor and describing a placement, sizing, or placement and sizing of two or more components that display the digital content of the supplier on the user viewable page, and send, to the browser, via the processor, based upon the request, an object comprising a set of two or more uniform resource locators (URLs) identifying where the two or more supplier-provided components may be obtained for insertion into the containers, such that the browser may parse the object, obtain the digital content from the set of two or more URLs, and populate the containers with the digital content, such that the two or more components render the digital content in the browser at the containers, such that the two or more components render the digital content in the browser;

wherein the digital content is supplied from the supplier to the particular content distributor via a feed, using a supplier-provided connector that generates the feed in a specific format of the particular content distributor's system without feed customization by the particular content distributor.

23. The method of claim 1, wherein the two or more components comprise:

a video player component configured to play a video stream of the digital content based on a user selection; and a related video component configured to display content based on the user selection.

* * * * *